(12) United States Patent
Nadabar et al.

(10) Patent No.: US 8,027,802 B1
(45) Date of Patent: Sep. 27, 2011

(54) METHOD AND APPARATUS FOR VERIFYING TWO DIMENSIONAL MARK QUALITY

(75) Inventors: Sateesha Nadabar, Framingham, MA (US); Venkat Gopalakrishnan, Arlington, MA (US); Carl W. Gerst, Boston, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 11/743,193

(22) Filed: May 2, 2007

Related U.S. Application Data (63) Continuation of application No. 11/427,420, filed on Jun. 29, 2006.

(51) Int. Cl.
*G06F 19/00* (2006.01)
(52) U.S. Cl. .................................................... 702/150
(58) Field of Classification Search ................... 702/150
See application file for complete search history.

(56) References Cited

U.S. PATENT DOCUMENTS

| | | | |
|---|---|---|---|
| 3,868,634 A | 2/1975 | Dolch | |
| 3,890,597 A | 6/1975 | Hanchett | |
| 4,282,425 A | 8/1981 | Chadima, et al. | |
| 4,308,455 A | 12/1981 | Bullis et al. | |
| 4,421,978 A | 12/1983 | Laurer et al. | |
| 4,782,220 A | 11/1988 | Shuren | |
| 4,866,784 A | 9/1989 | Barski | |
| 4,894,523 A | 1/1990 | Chadima, et al. | |
| 4,948,955 A | 8/1990 | Lee et al. | |
| 4,973,829 A | 11/1990 | Ishida et al. | |
| 5,028,772 A | 7/1991 | Lapinski et al. | |
| 5,120,940 A | 6/1992 | Willsie | |
| 5,124,537 A | 6/1992 | Chandler et al. | |
| 5,124,538 A | 6/1992 | Lapinski et al. | |
| 5,155,343 A | 10/1992 | Chandler | |
| 5,163,104 A | 11/1992 | Ghosh et al. | |
| 5,166,830 A | 11/1992 | Ishiba et al. | |
| 5,187,355 A | 2/1993 | Chadima et al. | |
| 5,187,356 A | 2/1993 | Chadima et al. | |
| 5,192,856 A | 3/1993 | Schaham et al. | |
| 5,262,625 A | 11/1993 | Tom et al. | |
| 5,262,626 A | 11/1993 | Goren et al. | |
| 5,276,315 A | 1/1994 | Surka | |

(Continued)

FOREIGN PATENT DOCUMENTS

DE  10012715  9/2000

(Continued)

OTHER PUBLICATIONS http://www.merriam-webster.com/dictionary/optimal, p. 1, Oct. 27, 2008.*

(Continued)

*Primary Examiner* — Tung S Lau
(74) *Attorney, Agent, or Firm* — Michael A. Jaskolski (57) ABSTRACT

A method and system for applying a two dimensional mark on a first surface of a component and assessing mark quality, the method comprising the steps of positioning a component with a first surface at a first station, applying a two dimensional mark to the first surface at the first station wherein the applied mark is intended to codify a first information subset, obtaining an image of the applied two dimensional mark at the first station, performing a mark quality assessment on the obtained image and performing a secondary function as a result of the mark quality assessment.

5 Claims, 9 Drawing Sheets

U.S. PATENT DOCUMENTS

| | | |
|---|---|---|
| 5,276,316 A | 1/1994 | Bianford |
| 5,278,397 A | 1/1994 | Barkan et al. |
| 5,286,960 A | 2/1994 | Longacre, et al. |
| 5,291,008 A | 3/1994 | Havens et al. |
| 5,296,690 A | 3/1994 | Chandler et al. |
| 5,304,786 A | 4/1994 | Pavlidis et al. |
| 5,332,892 A | 7/1994 | Li et al. |
| 5,378,883 A | 1/1995 | Batterman et al. |
| 5,412,197 A | 5/1995 | Smith |
| 5,418,862 A | 5/1995 | Zheng et al. |
| 5,420,409 A | 5/1995 | Longacre, et al. |
| 5,446,271 A | 8/1995 | Cherry et al. |
| 5,455,414 A | 10/1995 | Wang |
| 5,461,417 A | 10/1995 | White |
| 5,463,214 A | 10/1995 | Longacre, Jr. et al. |
| 5,478,999 A | 12/1995 | Figarella et al. |
| 5,481,098 A | 1/1996 | Davis et al. |
| 5,486,689 A | 1/1996 | Ackley |
| 5,487,115 A | 1/1996 | Surka |
| 5,507,527 A | 4/1996 | Tomioka et al. |
| 5,514,858 A | 5/1996 | Ackley |
| 5,523,552 A | 6/1996 | Shellhammer et al. |
| 5,539,191 A | 7/1996 | Ackley |
| 5,550,366 A | 8/1996 | Roustaei |
| 5,557,091 A | 9/1996 | Krummel |
| 5,591,956 A | 1/1997 | Longacre, et al. |
| 5,612,524 A | 3/1997 | San't Anselmo, et al. |
| 5,635,699 A | 6/1997 | Cherry et al. |
| 5,646,391 A | 7/1997 | Forbes et al. |
| 5,657,402 A | 8/1997 | Bender et al. |
| 5,675,137 A | 10/1997 | Van Haagen et al. |
| 5,682,030 A | 10/1997 | Kubon |
| 5,691,597 A | 11/1997 | Hara et al. |
| 5,723,853 A | 3/1998 | Longacre, Jr. et al. |
| 5,739,518 A | 4/1998 | Wang |
| 5,742,037 A | 4/1998 | Scola et al. |
| 5,744,790 A | 4/1998 | Li |
| 5,756,981 A | 5/1998 | Roustaei et al. |
| 5,767,497 A | 6/1998 | Lei |
| 5,767,498 A | 6/1998 | Heske, et al. |
| 5,777,309 A | 7/1998 | Maltsev et al. |
| 5,786,586 A | 7/1998 | Pidhirny et al. |
| 5,814,827 A | 9/1998 | Katz |
| 5,821,520 A | 10/1998 | Mulla et al. |
| 5,825,006 A | 10/1998 | Longacre, Jr. et al. |
| 5,852,288 A | 12/1998 | Nakazawa et al. |
| 5,872,354 A | 2/1999 | Hanson |
| 5,877,486 A | 3/1999 | Maltsev et al. |
| 5,880,451 A | 3/1999 | Smith et al. |
| 5,889,270 A | 3/1999 | Van Haagen et al. |
| 5,902,988 A | 5/1999 | Durbin |
| 5,914,476 A | 6/1999 | Gerst, et al. |
| 5,920,060 A | 7/1999 | Marom |
| 5,929,418 A | 7/1999 | Ehrhart et al. |
| 5,932,862 A | 8/1999 | Hussey et al. |
| 5,936,224 A | 8/1999 | Shimizu et al. |
| 5,949,052 A | 9/1999 | Longacre, Jr. et al. |
| 6,000,612 A | 12/1999 | Xu |
| 6,006,990 A | 12/1999 | Ye et al. |
| 6,021,946 A | 2/2000 | Hippenmeyer et al. |
| 6,053,407 A | 4/2000 | Wang et al. |
| 6,056,198 A | 5/2000 | Rudeen et al. |
| 6,075,905 A | 6/2000 | Herman et al. |
| 6,078,251 A | 6/2000 | Landt et al. |
| 6,082,619 A | 7/2000 | Ma et al. |
| 6,088,482 A | 7/2000 | He et al. |
| 6,095,422 A | 8/2000 | Ogami |
| 6,123,261 A | 9/2000 | Roustaei |
| 6,152,371 A | 11/2000 | Schwartz et al. |
| 6,158,661 A | 12/2000 | Chadima, Jr. et al. |
| 6,161,760 A | 12/2000 | Marrs |
| 6,176,428 B1 | 1/2001 | Joseph et al. |
| 6,189,792 B1 | 2/2001 | Heske |
| 6,206,289 B1 | 3/2001 | Sharpe et al. |
| 6,209,789 B1 | 4/2001 | Amundsen et al. |
| 6,234,395 B1 | 5/2001 | Chadima, Jr. et al. |
| 6,234,397 B1 | 5/2001 | He et al. |
| 6,250,551 B1 | 6/2001 | He et al. |
| 6,289,113 B1 * | 9/2001 | McHugh et al. ............... 382/117 |
| 6,298,176 B2 | 10/2001 | Longacre, et al. |
| 6,340,119 B2 | 1/2002 | He et al. |
| 6,371,373 B1 | 4/2002 | Ma et al. |
| 6,398,113 B1 | 6/2002 | Heske |
| 6,405,925 B2 | 6/2002 | He et al. |
| 6,408,429 B1 | 6/2002 | Marrion, et al. |
| 6,446,868 B1 | 9/2002 | Robertson et al. |
| 6,454,168 B1 | 9/2002 | Brandt et al. |
| 6,490,376 B1 | 12/2002 | Au et al. |
| 6,491,223 B1 | 12/2002 | Longacre, Jr. et al. |
| 6,505,778 B1 | 1/2003 | Reddersen et al. |
| 6,512,714 B2 | 1/2003 | Hanzawa et al. |
| 6,513,714 B1 | 2/2003 | Davis et al. |
| 6,513,715 B2 | 2/2003 | Heske, et al. |
| 6,581,427 B2 | 5/2003 | Davis, et al. |
| 6,629,642 B1 | 10/2003 | Swartz et al. |
| 6,677,852 B1 | 1/2004 | Landt |
| 6,681,151 B1 | 1/2004 | Weinzimmer et al. |
| 6,698,656 B2 | 3/2004 | Parker et al. |
| 6,728,419 B1 | 4/2004 | Young |
| 6,761,316 B2 | 7/2004 | Bridgelall |
| 6,816,063 B2 | 11/2004 | Kubler |
| 6,913,199 B2 | 7/2005 | He |
| 6,919,793 B2 | 7/2005 | Heinrich |
| 7,044,378 B2 | 5/2006 | Patel et al. |
| 7,059,525 B2 | 6/2006 | Longacre Jr. et al. |
| 7,061,524 B2 | 6/2006 | Liu et al. |
| 7,070,099 B2 | 7/2006 | Patel |
| 7,121,467 B2 | 10/2006 | Winter |
| 7,175,090 B2 | 2/2007 | Nadabar |
| 7,181,066 B1 | 2/2007 | Wagman |
| 7,219,841 B2 | 5/2007 | Biss et al. |
| 7,604,174 B2 | 10/2009 | Gerst, et al. |
| 2001/0042065 A1 | 11/2001 | Yoshihiro, et al. |
| 2001/0042789 A1 | 11/2001 | Krichever et al. |
| 2002/0044689 A1 | 4/2002 | Roustaei et al. |
| 2002/0171745 A1 | 11/2002 | Ehrhart |
| 2003/0090586 A1 * | 5/2003 | Jan et al. ....................... 348/335 |
| 2003/0117511 A1 * | 6/2003 | Belz et al. ................ 348/333.11 |
| 2003/0121978 A1 | 7/2003 | Rubin et al. |
| 2004/0026508 A1 | 2/2004 | Nakajima et al. |
| 2004/0091255 A1 * | 5/2004 | Chase et al. ................... 396/176 |
| 2005/0180804 A1 | 8/2005 | Andrew et al. |
| 2005/0263599 A1 | 12/2005 | Zhu et al. |
| 2005/0275897 A1 | 12/2005 | Fan et al. |
| 2006/0022052 A1 | 2/2006 | Patel et al. |
| 2006/0027657 A1 | 2/2006 | Nunnink et al. |
| 2006/0027661 A1 | 2/2006 | Hosoi et al. |
| 2006/0131418 A1 | 6/2006 | Testa |
| 2006/0132787 A1 | 6/2006 | Mestha et al. |
| 2006/0249581 A1 | 11/2006 | Smith, et al. |
| 2006/0285135 A1 | 12/2006 | Mestha et al. |
| 2008/0004822 A1 | 1/2008 | Nadabar et al. |
| 2008/0011855 A1 | 1/2008 | Nadabar |
| 2008/0019615 A1 | 1/2008 | Schnee et al. |
| 2009/0090781 A1 | 4/2009 | Ye et al. |
| 2009/0121027 A1 | 5/2009 | Nadabar |

FOREIGN PATENT DOCUMENTS

| | | |
|---|---|---|
| EP | 0571892 | 12/1993 |
| EP | 0896290 | 10/2004 |
| EP | 1469420 | 10/2004 |
| EP | 1975849 | 1/2008 |
| WO | 2009613797 | 5/1996 |
| WO | 0215120 | 2/2002 |
| WO | 02075637 | 9/2002 |
| WO | 2008118419 | 10/2008 |
| WO | 2008118425 | 10/2008 |

OTHER PUBLICATIONS

Cognex Corporation, Implementing Direct Part Mark Identifications: 10 Important Considerations, ID Products, Copyright 2004.

Rolls-Royce, Direct Part Marking, Implementation Guide, Issue 1—Vcom 9897, Jun. 2004.

International Standard, ISO/IEC 16022 First Edition May 1, 2000—Reference No. ISO/IEC 16022:2000(E) Information Technology—International symbology Specification—Data Matrix.

SAE Aerospace Standar AS9132, International Aerospace Quality Group (IAQG), Verification Standard, Feb. 2002.

Taniguchi, R-I, et al, A Distributed-Memory Multi-Thread Multiprocessor Architecture for Computer Vision and Image Processing: Optimized Version of AMP, System Sciences, Los Alamitos, CA, 1993.

Wittenburg, J.P., et al, A Multithreaded Architecture Approach to Parallel DSP's for High Performance Image Processing Applications, Signal Processing Systems, Piscataway, NJ, 1999.

* cited by examiner

METHOD AND APPARATUS FOR VERIFYING TWO DIMENSIONAL MARK QUALITY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to mark verification systems and more specifically to a mark verification system that uses versatile methods that enable various verification configurations to be employed.

Many different industries require that marks be applied to manufactured components so that the components can be tracked during distribution, when installed or assembled, during maintenance processes, during use and after use. For instance, in the jet engine industry, jet engines include, among other components, turbines that include turbine blades that are manufactured in various size lots. Here, each turbine blade is marked when manufactured so that the blade can be tracked. Prior to the blade being disposed of, if any defect is ever detected in the blade, the defect can be traced back to a lot and a manufacturing process associated therewith so that any possible defects in other blades of the lot can be identified. Where marks are applied directly to components/parts, the marks are generally referred to as direct part marks (DPMs).

To directly mark components, known marking systems have been set up that include a marking station that applies a mark to a component. For instance, in at least some cases a marking station will apply a DataMatrix barcode symbol to each manufactured component where a DataMatrix symbol is a two-dimensional barcode that stores from 1 to about 2,000 characters. An exemplary DataMatrix symbol is typically square and can range from 0.001 inch per side up to 14 inches per side. As an example of density, 500 numeric only characters can be encoded in a 1-inch square DataMatrix symbol using a 24-pin dot matrix marking machine.

Despite attempts to apply marks that can be read consistently thereafter, sometimes mark application errors occur such that the mark cannot be subsequently consistently read and decoded properly. For instance, in some cases the surface to which the mark is applied may be somewhat discolored so that the contrast of the mark to the background of the application surface is not optimal. As another instance, in some cases where a mark consists of a plurality of dots, the dot sizes may be too large so that spaces there between are not perfectly discernible or the dot sizes may be too small to be recognized by some types of readers. As still other instances, axial non-uniformity of grid non-uniformity of the applied mark may be too great to reliably read. Many other mark metrics may be imperfect and may render mark difficult if not impossible to decode using many readers.

Whether or not a mark that has been applied to a component is readable often depends on the reading and decoding capabilities of a reader used to read and decode the mark. For instance, some relatively complex and expensive readers are capable of reading extremely distorted marks while cannot read marks that are not almost perfect.

To verify that applied marks are of sufficient quality to be read by readers at a specific facility (i.e., by the least sophisticated reader that is used at a specific facility), often marking systems will include, in addition to a marking station, a stationary verification station and at least a portion of a transfer line to transfer freshly marked components from the marking station to the verification station. Here, after a mark is applied to a component, the component is transferred via the transfer line to the verification station where the mark is precisely aligned with an ideal stationary light source and a stationary camera/mark reader that is juxtaposed such that a camera field of view is precisely aligned with the mark. After alignment, the reader reads the mark and attempts to verify code quality.

Verification can include several steps including decoding the mark and comparing the decoded information to known correct information associated with the mark that should have been applied. In addition, verification may also include detecting mark size, geometric mark characteristics (e.g., squareness of the mark), symbol contrast, quantity of applied ink, axial non-uniformity, grid non-uniformity, extreme reflectance, dot diameter, dot ovality, dot position, background uniformity, etc.

When a mark does not pass a verification process (i.e., mark quality is low), the marked component may be scrapped to ensure that the marked component does not enter distribution channels.

When a marked component passes a verification test at a manufacturing facility and is shipped to a client facility, when the component is received at a client's facility, it is often desirable for the client to independently verify that mark quality is sufficient for use with all of the readers at the facility and to decode the mark information to verify component type, to establish a record of received components, to begin a warranty period, etc. To this end, some known facilities include stationary verification systems akin to the verification stations at the component manufacturing facility described above that perform various verification processes including decoding to verify mark quality. To this end, known verification systems, like the known verification station described above, include some stationary mechanism (e.g., mechanical locking devices, sensors, etc.) for precisely aligning the mark on the component with a stationary ideal light source and a stationary camera so that the camera can generate an image of the mark and a processor can then glean mark verifying information from the mark.

While marking/verification systems of the above kind work well to mark components and to verify mark quality, such systems have several shortcomings. First, a full blown mark verification station that requires specific lighting, mark and component juxtaposition and reader alignment requires a large amount of hardware dedicated to each verification process. In the case of a verification station that follows a marking station, the additional hardware includes an extra transfer line station, a dedicated light source, alignment sensors, etc. In the case of a verification system at a client's facility the additional hardware includes a dedicated camera, light source and component alignment mechanism. Additional hardware increases costs appreciably.

Second, stationary verification stations and systems slow down the manufacturing and component use processes as additional component movements and alignment procedures are required at both the manufacturing facility and a client's facility. In addition to requiring more time, additional process steps reduce product throughput and therefore should be avoided whenever possible.

BRIEF SUMMARY OF THE INVENTION

At least some embodiments of the invention include a method for applying a two dimensional mark on a first surface of a component and assessing mark quality, the method comprising the steps of positioning a component with a first surface at a first station, applying a two dimensional mark to the first surface at the first station wherein the applied mark is intended to codify a first information subset, obtaining an image of the applied two dimensional mark at the first station, performing a mark quality assessment on the mark in the obtained image and performing a secondary function as a result of the mark quality assessment.

In some embodiments the step of obtaining an image includes providing a stationary camera at the first station that has a field of view that is centered along a trajectory that forms an obtuse angle with at least a portion of the first surface.

In some cases the of providing a camera includes positioning the camera so that the field of view is centered along a trajectory that forms an obtuse angle with a central portion of the first surface.

In some embodiments the step of performing a mark quality assessment includes attempting to decode the image of the mark and when the image is successfully decoded, gleaning other mark quality characteristics from the mark in the obtained image.

In some cases the step of gleaning other mark quality characteristics includes gleaning at least a subset of geometric characteristics of the mark, mark size, mark color, mark shading, symbol contrast, axial non-uniformity of the mark, grid non-uniformity of the mark, extreme reflectance, angle of distortion, dot diameter, dot ovality, dot position, image sharpness and background uniformity.

In some embodiments the step of gleaning other mark quality characteristics includes obtaining information from the mark in the obtained image indicative of the degree of at least one irregularity in the obtained image, the step of performing a mark quality assessment further including, where the degree of the at least one irregularity in the image exceeds a tolerable level, at least in part compensating for the irregularity thereby generating a compensated mark, gleaning mark quality characteristics from the compensated mark and generating an applied mark quality value as a function of the gleaned characteristics from the compensated mark.

In other embodiments the step of performing a mark quality assessment further includes comparing the applied mark quality value to a baseline assessment value, the secondary function including, when the applied mark quality value is below the baseline value, indicating a low mark quality level.

In some cases the secondary function further includes, when the applied mark quality value is at least equal to the baseline value, indicating a high mark quality level.

In still further embodiments the first surface may be warped, the at least one irregularity including at least a subset of non-optimal lighting, first surface warping, lens/optical distortion, perspective distortion, and perceived background texture.

In some cases the at least one irregularity is geometric distortion, the step of compensating including using the decoded information to generate a synthetic ideal mark model and using the ideal mark model to compensate for the geometric distortion.

In some embodiments the method further includes the step of providing known mark characteristics, the step of generating a synthetic ideal mark model including using both the provided known mark characteristics and the decoded information.

In at least some embodiments the step of using the ideal mark model includes using the ideal mark model and the mark in the obtained image to generate a difference map and using the difference map to compensate for the irregularity in the mark in the obtained image.

In some cases the step of performing a mark quality assessment includes attempting to decode the image of the mark and when the image is successfully decoded, unwarping the mark to at least in part compensate for mark distortion thereby generating an unwarped mark, gleaning mark quality characteristics from the unwarped mark, generating an applied mark quality value as a function of the gleaned characteristics from the unwarped mark and comparing the applied mark quality value to a baseline assessment value, the secondary function including, when the applied mark quality value is below the baseline value, indicating a low mark quality level.

In yet other embodiments the step of unwarping the mark thereby generating an unwarped mark includes using the decoded information from the mark to generate a synthetic ideal mark model, comparing the synthetic ideal mark model to the mark in the obtained image to generate a deformation map and unwarping the mark using the deformation map to generate the unwarped mark.

In some cases the step of obtaining an image at the first station includes supporting a handheld mark reader adjacent the first station.

In some embodiments the step of performing a mark quality assessment on the obtained image includes decoding the mark in the obtained image, using the decoded information to generate a synthetic ideal mark model, using the ideal mark model and the mark in the obtained image to generate a difference map and using the difference map to compensate the mark obtained in the image for at least a subset of non-optimal lighting, first surface warping, lens/optical distortion, perspective distortion, and perceived background texture.

In still other cases the step of gleaning other mark quality characteristics includes obtaining information from the mark in the obtained image indicative of the degree of at least one irregularity in the obtained image and, when the degree of the at least one irregularity exceeds a tolerable level, providing a feedback signal indicating that the degree or irregularity is intolerable.

In addition, some embodiments include a method for assessing quality of a two dimensional mark that is applied to a first surface of a component, the method comprising the steps of (a) providing a two dimensional mark on a first surface of a component, (b) providing a handheld mark reader that includes a field of view, (c) positioning the handheld reader with respect to the component such that the first surface is in the field of view, (d) obtaining an image of the two dimensional mark, (e) attempting to decode the image to obtain an applied mark information subset, (f) when the image is successfully decoded: (i) performing a mark quality assessment on the image and (ii) performing a secondary function as a function of the mark quality assessment results.

Moreover, some embodiments include a method for assessing the quality of a two dimensional mark applied to a first surface of a component using a handheld reader that includes a field of view, the method comprising the steps of (a) providing a component with a two dimensional mark on a first surface wherein the applied mark is intended to codify a first information subset, (b) positioning the handheld reader with respect to the component such that the first surface is in the field of view, (c) obtaining an image of the mark using the handheld reader, (d) performing a mark quality assessment on the obtained image to generate an applied mark quality value, (e) where the applied mark quality value is lower than a baseline assessment value, providing at least one of an audible signal and a visual signal to a handheld reader user indicating that the reader should be repositioned, after the reader is repositioned, repeating steps (c) through (e) until an applied mark quality value is at least equal to the baseline assessment value and, when the applied mark quality value is at least equal to the baseline assessment value, providing at least one of an audible signal and a visual signal to the reader user indicating that the applied mark quality value is at least equal to the baseline assessment value.

Some embodiments include a system for applying a two dimensional mark on a first surface of a component and assessing mark quality, the system comprising a mark applier positioned proximate a first space for applying a two dimensional mark to a first surface of a first component when the first surface is located in the first space, a stationary camera having a field of view and positioned adjacent the first space so that the first space is in the field of view, the camera for obtaining an image of the two dimensional mark after the mark is applied to the first surface and a processor linked to the camera for receiving the image and performing a mark quality assessment on the obtained image, the processor performing a secondary function as a result of the mark quality assessment.

Some embodiments include a system for assessing the quality of a two dimensional mark applied to a first surface of a component, the system comprising a handheld reader including a field of view, the reader for obtaining an image of the two dimensional mark when the mark is within the reader field of view and a processor for receiving reader generated images and programmed to perform a mark quality assessment process on the obtained images to generate quality assessment values associated with the images, when the quality assessment value is lower than a baseline assessment value, the processor providing one of an audible signal and a visual signal to a handheld reader user indicating that the reader should be repositioned so that a new image can be obtained and, when a quality assessment value is at least equal to the baseline assessment value, providing one of an audible signal and a visual signal to the handheld reader user indicating that the quality assessment value is at least equal to the baseline assessment value.

Still other embodiments include a method for assessing quality of a two dimensional mark that is applied to a first surface, the method comprising the steps of obtaining an image of the applied two dimensional mark, decoding the mark in the obtained image to generate a first information subset, using the first information subset to generate a synthetic ideal mark model, comparing the synthetic ideal mark model to the mark in the obtained image to generate a difference map, using the difference map to at least in part compensate for at least one irregularity in the mark in the obtained image thereby generating a compensated mark and assessing the quality of the compensated mark.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Referring now to the drawings wherein like reference numerals correspond to similar elements throughout the several views and, more specifically, referring to FIG. 1, one inventive embodiment will be described in a context of an exemplary marking and verification station 10 that includes, among other components, a marker or marking subassembly or machine 12, a camera subassembly or camera 14, a marked item support stand 16 and a marker/camera support stand 18. As the label implies, support stand 16 supports an item 21 to be marked on a top surface and, generally, so that a first surface 20 of item 21 on which a mark is to be applied is within a first area or space 22. Although shown as a table, stand 16 may take other forms including a position of a transfer line. Each of the marker 12 and camera 14 are supported by stand 18 adjacent stand 16 and, more specifically, adjacent first area or space 22. Marker 12 is arranged with respect to first space 22 such that marker 12 can apply a two dimensional DataMatrix or other type of two dimensional mark 19 to surface 20. Although shown as stationary, marker 12 may move vertically upward and downward at station 10 to apply marks 19 and to move out of the way so that items (e.g., 21) can be moved from station 10 to other locations without interference from marker 12.

Figure 1:
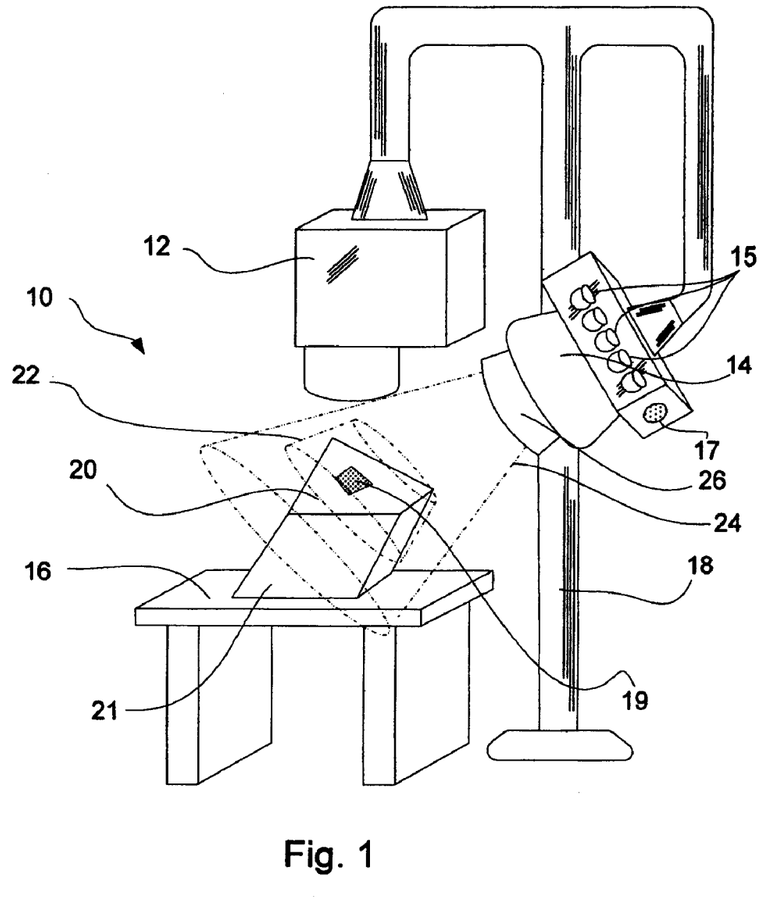
FIG. 1 is a schematic illustrating an exemplary marking and stationary mark verification system that resides at a single station where a mark can be applied to a stationary item and a camera can be used with the stationary item to obtain an image of the applied two dimensional mark for verification purposes.

Referring still to FIG. 1, camera 14 includes optics 26 that focus a field of view 24 along a trajectory such that at least a portion of the field of view 24 forms an obtuse angle with the first surface 20 on which the two dimensional mark 19 is placed when item 21 is supported at station 10. In the illustrated example, the entire first surface 20 is within the field of view 24 of camera 14. In other embodiments, it may be that just the portion of first surface 20 on which the mark 19 is applied is within the field of view of camera 14.

In operation, when an item 21 is placed and supported at station 10 below marker 12, marker 12 applies a two dimensional DataMatrix or other type of two dimensional mark 19 to first surface 20. After the mark is applied, camera 14 obtains an image of the mark 19 and the image is processed to verify that the mark is of sufficient quality to be used by mark readers subsequently.

Figure 2:
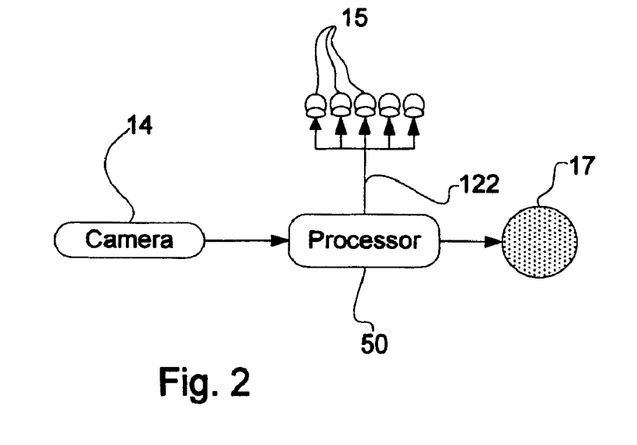
FIG. 2 is a schematic diagram illustrating various components of one of the subassemblies of FIG. 1.

Referring still to FIG. 1 and also FIG. 2, to perform the verification process, camera 14 is linked to a processor 50 which may either be part of camera 14, locally linked to camera 14 or may be remotely linked (e.g., via a local area network, a wide area network, the Internet, etc.). Processor 50 is linked to one or more visual output devices 15 and/or one or more audio output devices 17 to provide feedback to a system user indicating the results of the verification process (e.g., whether or not the quality of the imaged mark meets or exceeds a baseline quality assessment value. For example, visual feedback devices may include lights or light emitting diodes) 15 and the audio feedback device may include a small speaker or beeper device 17. In at least some cases, one of the visual devices 15 may be illuminated when mark quality is at least equal to the baseline quality value while another of the LEDs 15 may be illuminated when mark quality is below the baseline quality value. Here, different LED colors may be used to indicate whether or not the mark quality passes the baseline value test (e.g., a green LED may indicate high mark quality while a red LED indicates a mark that failed the quality test).

Figure 3:
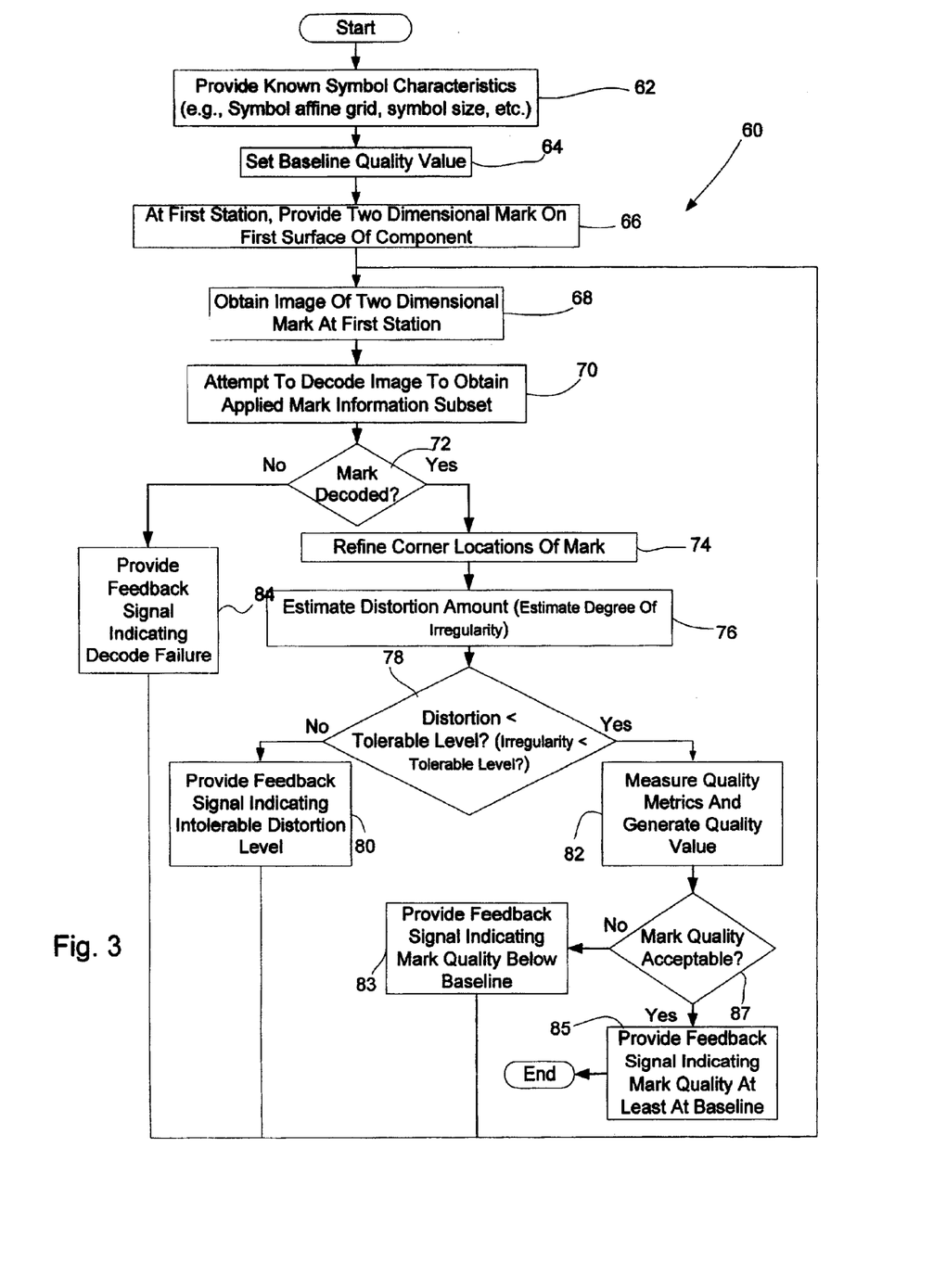
FIG. 3 is a flowchart illustrating at least one method that may be performed by the processor of FIG. 2 to identify mark quality and provide feedback.

Refer now to FIG. 3, an exemplary method 60 that is consistent with at least some inventive embodiments is illustrated. Referring also to FIGS. 1 and 2, at block 62, known characteristics of the type of symbol (e.g., DataMatrix) to be read and verified are provided to processor 50 via a system interface (not illustrated, e.g. a computer). Here, the known symbol characteristics may include, among others, a symbol affine grid, a symbol size, geometric features (e.g., boundary shape) of a symbol type, etc. At block 64, a baseline quality value is set. Here, the baseline quality value will, in general, be some percentage assessment of a nominal value corresponding to a minimal resemblance required between an applied mark and what the mark would look like if it were an ideal mark. For example, where a perfect match between an applied mark and an ideal mark is equal to a nominal value of 100, the baseline quality value may have a value of 80. Here, a baseline value of 80 would correspond to lesser resemblance than a baseline value of 90, and a baseline value of 90 would correspond to lesser resemblance in a baseline value of 95, and so on. The algorithms used to identify quality values are a matter of designer choice but may take into account, in addition to other mark characteristics, symbol contrast, axial nonuniformity, grid nonuniformity, print growth, extreme reflection, angle of distortion, dot diameter, dot ovality, dot position, cell separability, symbol separability, finder pattern conformity, finder pattern conformity dot, image sharpness and background uniformity. Each factor may be equally weighted or, in at least some cases, factors may be differently weighted.

Referring still to FIGS. 1 through 3, at process block 66, a two dimensional mark is applied to first surface 19 of component 21 at first station 10 via marker 12. At block 68, after the two dimensional mark has been applied, camera 14 obtains an image of the two dimensional mark at first station 10. At block 70, processor 50 attempts to decode the image to obtain an applied mark information subset. Here, decoding comprises actually reading out the information that is coded by the mark 19 to provide a first information subset.

Continuing, at decision block 72, processor 50 determines whether or not the two dimensional mark has been successfully decoded. Where the mark has not been successfully decoded control passes to block 84 where processor 50 provides at least one of an audible signal and a visual feedback signal indicating that the mark has not been successfully decoded. For instance, to indicate failure to decode, a red LED 15 (see FIGS. 1 and 2) may be illuminated. After block 84, control passes back up to block 66 where item 21 is removed from station 10 and another item to be marked is moved to station for marking and verification. In at least some cases, after one or more mark verification processes result in failed mark verifications, a system operator may adjust marker 12 settings in a manner intended to increase mark quality.

Referring still to FIGS. 1 through 3, if, at decision block 72, mark 19 is successfully decoded, control passed to block 74 where processor 50 refines the corner locations of the mark 19. At block 76, processor 50 estimates the distortion amount of the mark from the refined corner locations of the mark identified in block 74. More specifically, for instance, if it is known that the two dimensional mark 19 has a square outer border or boundary, distortion may be estimated by comparing the actual mark boundary to a square shape. At decision block 78, processor 50 determines whether or not the mark distortion is less than or greater than a tolerable distortion level. Where the distortion in the mark is greater than the tolerable level, control passes to block 80 where processor 50 provides a feedback signal indicating that distortion in the mark is greater than the tolerable level. Here, again, processor 50 may provide the feedback signal by illuminating one of the LEDs 50 or, alternatively, by generating a sound via speaker 17.

Referring once again to decision block 78, where distortion is less than the tolerable level, control passes to block 82 where a feedback signal is provided that indicates that mark quality is at least at the baseline value after which control passes to block 82 where processor 50 gleans quality metrics from the image of the mark and generates an applied mark quality value. At block 87 processor 50 compares the applied mark quality value to the baseline quality value and, where the applied mark quality value is greater than the baseline value a feedback signal is provided at block 85 and where the applied mark quality value is below the baseline a quality failure signal is generated at block 83. After each of blocks 80 and 83 control passes backup to block 66. After block 85 the process ends.

Figure 4:
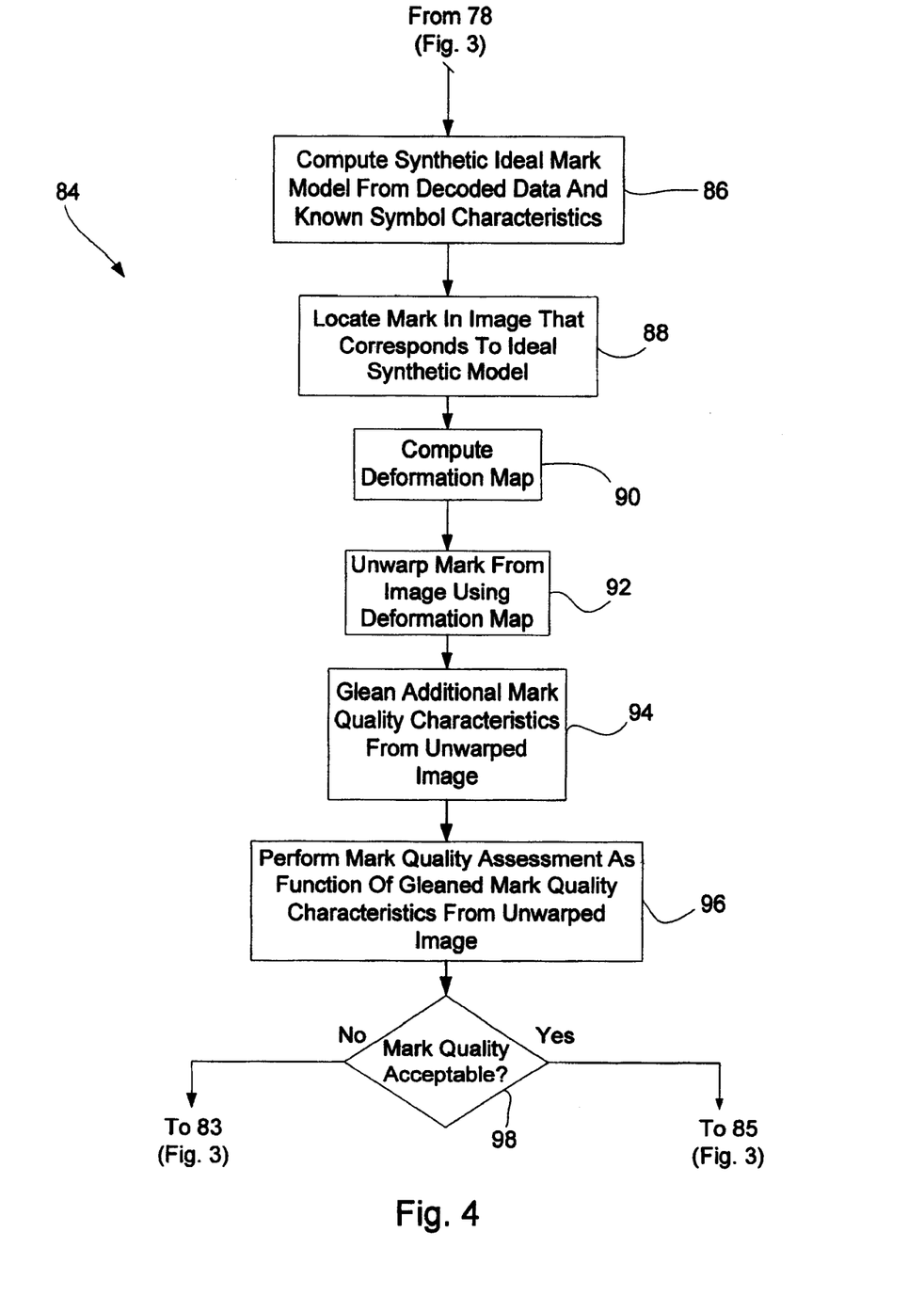
FIG. 4 is a flowchart illustrating a subprocess that may be substituted for a portion of the process illustrated in FIG. 3.

Referring now to FIG. 4, an exemplary subprocess 84 that may be added to the method 60 of FIG. 3 is illustrated. Referring also to FIGS. 1 through 3, and, specifically to block 78 in FIG. 3, when distortion exceeds the tolerable level, in at least some embodiments, control passes to block 86 in FIG. 4. At block 86, processor 50 computes a synthetic ideal symbol model from the decoded data and the known symbol characteristics. To this end, processor 50 uses the mark information subset that was identified at process block 70 in FIG. 3 and the known symbol characteristics that were provided at process block 62 in FIG. 3 and generates an ideal synthetic symbol or mark model for the specific symbol or mark 19 that was applied to surface 20 and that was imaged via camera 14. At block 88, processor 50 precisely locates the actual mark in the image that corresponds to the synthetic model. At block 90, processor 50 compares the actual mark image to the ideal synthetic symbol model to generate a deformation map. Here, for instance, where the model calls for a square mark and the mark in the image includes a rhombus that has other than 90° angles, the deformation map would indicate how the rhombus could be stretched and compressed to result in a square. At block 92, processor 50 uses the deformation map to unwarp the original mark from the image. (e.g., in the previous example, by stretching and compressing the rhombus into a square). At block 94, processor 50 gleans additional mark quality characteristics from the unwarped image, and at block 96 processor 50 performs a mark quality assessment as a function of gleaned marked quality characteristics from the unwarped image. At block 98, the mark quality is again assessed and is compared to the baseline quality value as set at block 64 in FIG. 3.

Where mark quality is not acceptable, control passes from block 98 to block 83 in FIG. 3 where a feedback signal is generated by processor 50 indicating that the mark quality is below a baseline value. At decision block 98, where mark quality is at an acceptable level, control passes back to block 85 in FIG. 3 where a feedback signal is provided that indicates that mark quality is at least at the baseline after which control again passes back up to block 68. Thus, the subprocess 84 in FIG. 4 can compensate for at least some degree of lens/optical distortion, perspective distortion and nonlinearities of the surface to which the mark 19 is applied (e.g., the surface 20 (see again FIG. 1) may be cylindrical, may be formed by a flexible sheet, etc.).

In at least some cases it is contemplated that irregularities in a mark image other than geometric deformations may be compensated for prior to completing a mark quality assessment. For instance, other image irregularities may include non-uniform lighting of a mark that shows up in the obtained image, background texture of the surface (see 20 in FIG. 1) to which a mark is applied, etc. To compensate for other irregularities, referring again to FIG. 3, at blocks 76 and 78 the degrees of the other irregularities may be identified and compared to tolerable levels and when intolerable levels are identified, control may pass to the subprocess 84 of FIG. 4.

Figure 5:
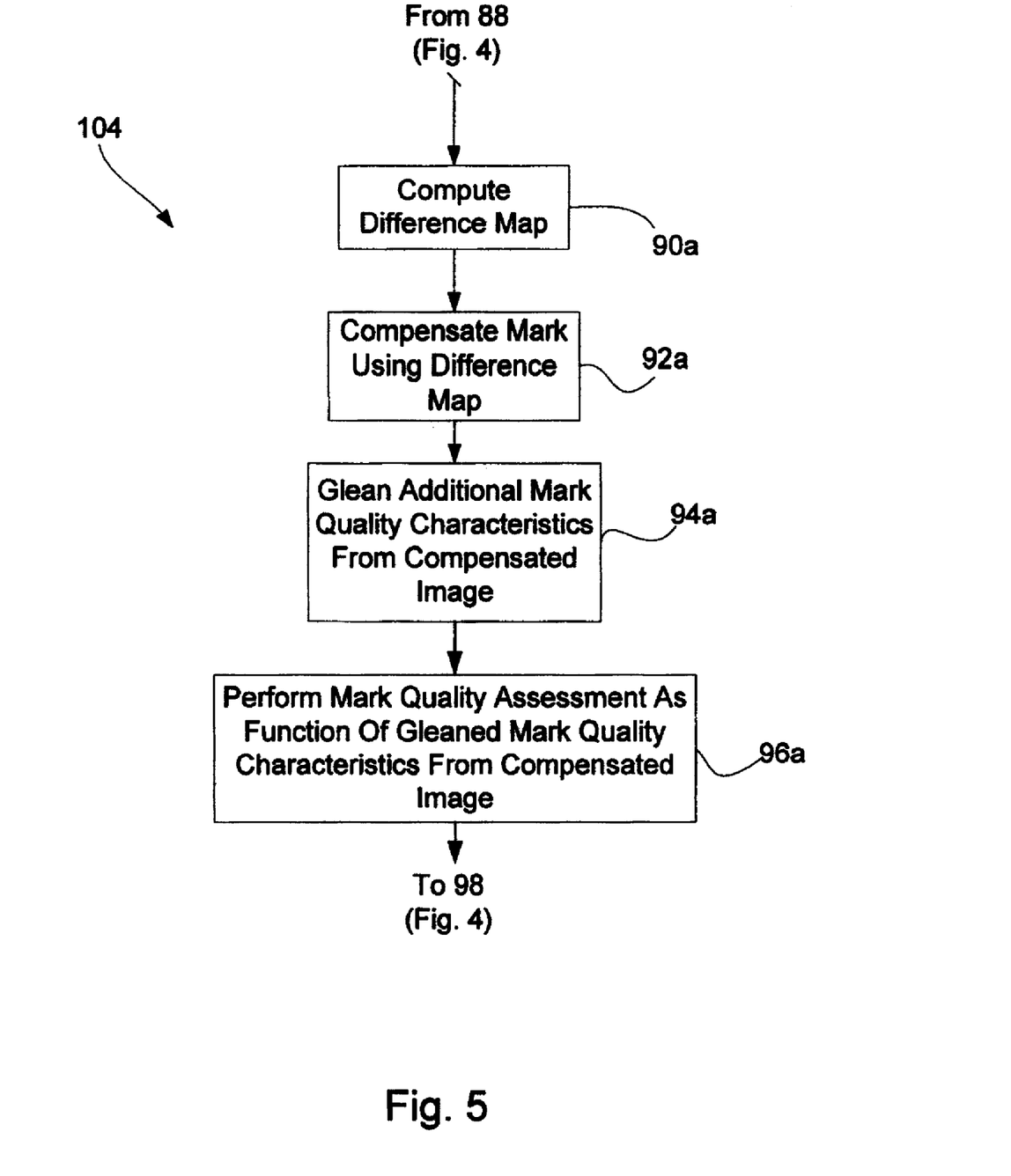
FIG. 5 is a flowchart illustrating a subprocess that may be substituted for one of the process blocks of FIG. 4.

In this case, the subprocess in FIG. 4 would be modified to compensate for the other irregularity. For instance, where the other irregularity is lighting non-uniformity, the subprocess 104 of FIG. 5 may be substituted for a portion of the FIG. 4 subprocess 84. Here, in FIG. 4, after the mark is located in the image at block 88, control passes to block 90a in FIG. 5 where a difference map is computed that represents the perceived lighting difference between the synthetic ideal mark model (see block 86) and the imaged mark. At block 92a the difference map is used to compensate the imaged mark thereby generating a compensated image. At block 94a mark quality characteristics are gleaned from the compensated image and at block 96a an applied mark quality value is generated after which control passes back to block 98 in FIG. 4.

In at least some cases several different irregularity compensating processes may be performed on an imaged mark prior to assessing mark quality. For instance, after decoding is successful at block 72 in FIG. 3, geometric distortions may be compensated first after which the effects of lighting non-uniformity are compensated second, after which the effects of background surface texture are compensated, and so on. In another contemplated case, a single complex compensation algorithm may compensate for two or more irregularities (e.g., geometric distortion and lighting non-uniformity) simultaneously. Moreover, while FIG. 3 and the discussion above generally teach that irregularities are compensated only when they exceed tolerable levels (see block 78), in at least some embodiments irregularities may be compensated all the time irrespective of the degree of irregularity level. In this case, in FIG. 3, control would pass directly from block 72 to block 86 in FIG. 4 where the synthetic ideal mark model is computed.

Figure 6:
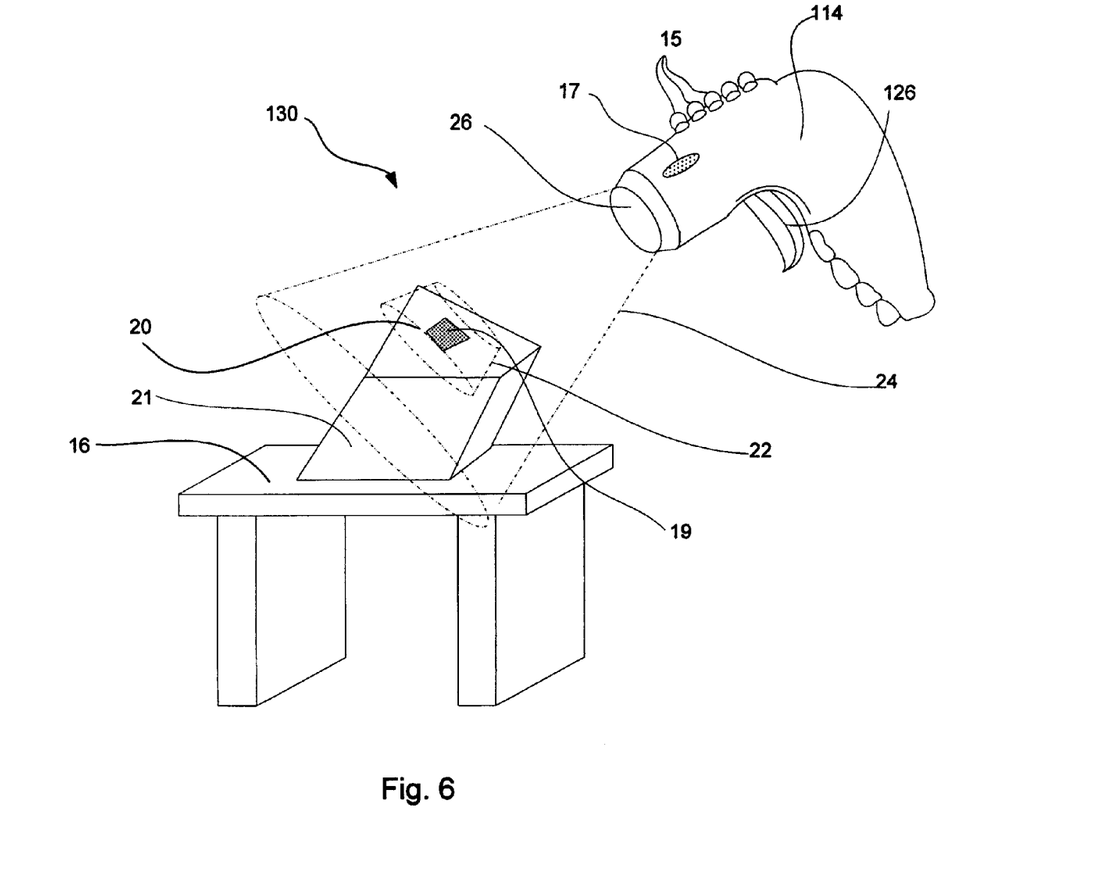
FIG. 6 is a schematic similar to FIG. 1, albeit illustrating a second system configuration where a handheld reader as opposed to a stationary camera is employed to obtain an image of a mark.

Referring now to FIG. 6, a second embodiment consistent with at least some aspects of the present invention is illustrated that is used at a station 130. Here, components that are similar to the components described above with respect to FIG. 1 are not described in detail. Instead, in the interest of simplifying this explanation, components that are similar to or identical to components described above with respect to FIG. 1 are labeled using the same numerals. For example, numeral 16 is used in each of FIGS. 1 and 6 to identify an item support table or structure, numeral 24 is used to label a camera field of view, etc.

There are two primary differences between the station 10 shown in FIG. 1 and the station 130 shown in FIG. 6. In FIG. 6, station 130 does not include a marker or marker machine akin to marker 12 in FIG. 1. While no marker is shown, in some embodiments a marker could be provided at station 130. In addition, instead of including a stationary camera 14, a handheld reader or camera device 114 is included for use at station 130 for obtaining images that include images of marks (e.g., see 19 in FIG. 6). Here, the handheld device 114 includes optics 26 for focusing the field of view 24 of the reader, a trigger 126 that, when activated, causes the reader 114 to obtain an image, visual feedback devices such as, for instance, LEDs 15, and an audio output device, in the illustrated embodiment, including a speaker 17. Referring also to FIG. 2, here, it is contemplated that reader 114 would include a processor 50 linked to each of a camera and the output devices 15 and 17. Reader 114 may be feathered via a power and data card or may be wireless.

Figure 7:
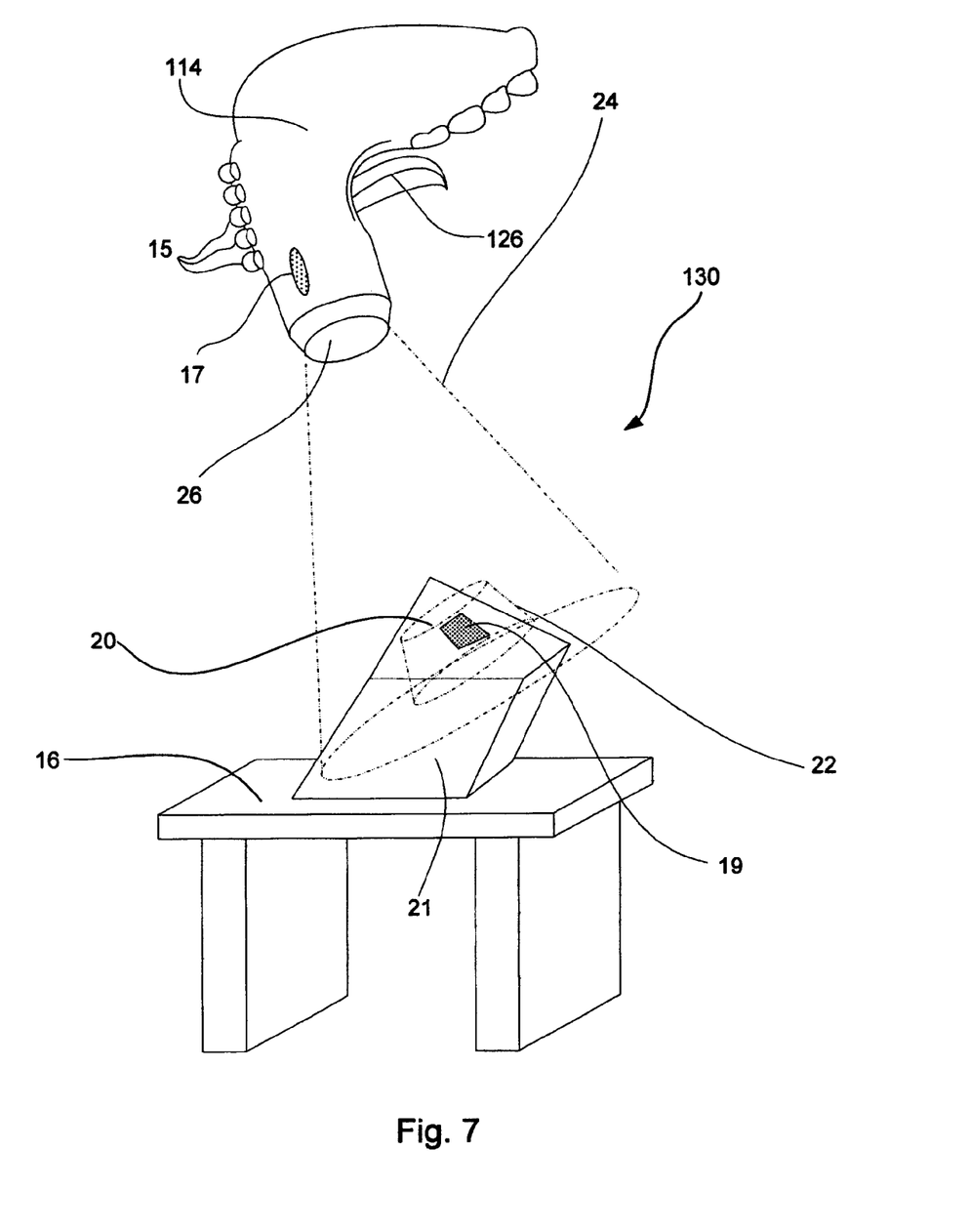
FIG. 7 is similar to FIG. 6, albeit showing the handheld reader in a second juxtaposition relative to a mark.

Referring still to FIG. 6, here, it should be appreciated that because device 114 is portable and can be moved about station 130, device 114 is not stationary and therefore the field of view 24 and its relation to a mark 19 can be and typically is altered during use. Because the orientation of device 114 changes with respect to marks being imaged, the amount of distortion associated with images obtained from different angles with respect to the mark surface 20 should vary. Thus, for instance, while a certain amount of distortion in the image of mark 19 will occur when handheld reader 114 is used to obtain an image from the angle shown in FIG. 6, another amount of distortion will result when reader 114 is oriented as shown in FIG. 7 when an image of mark 19 is obtained. Here, a slightly different process is performed to verify mark quality wherein, in at least some cases, a handheld reader user can be prompted to change the position of the reader 114 with respect to a mark when mark quality does not exceed a baseline quality value or when decoding fails.

Figure 8:
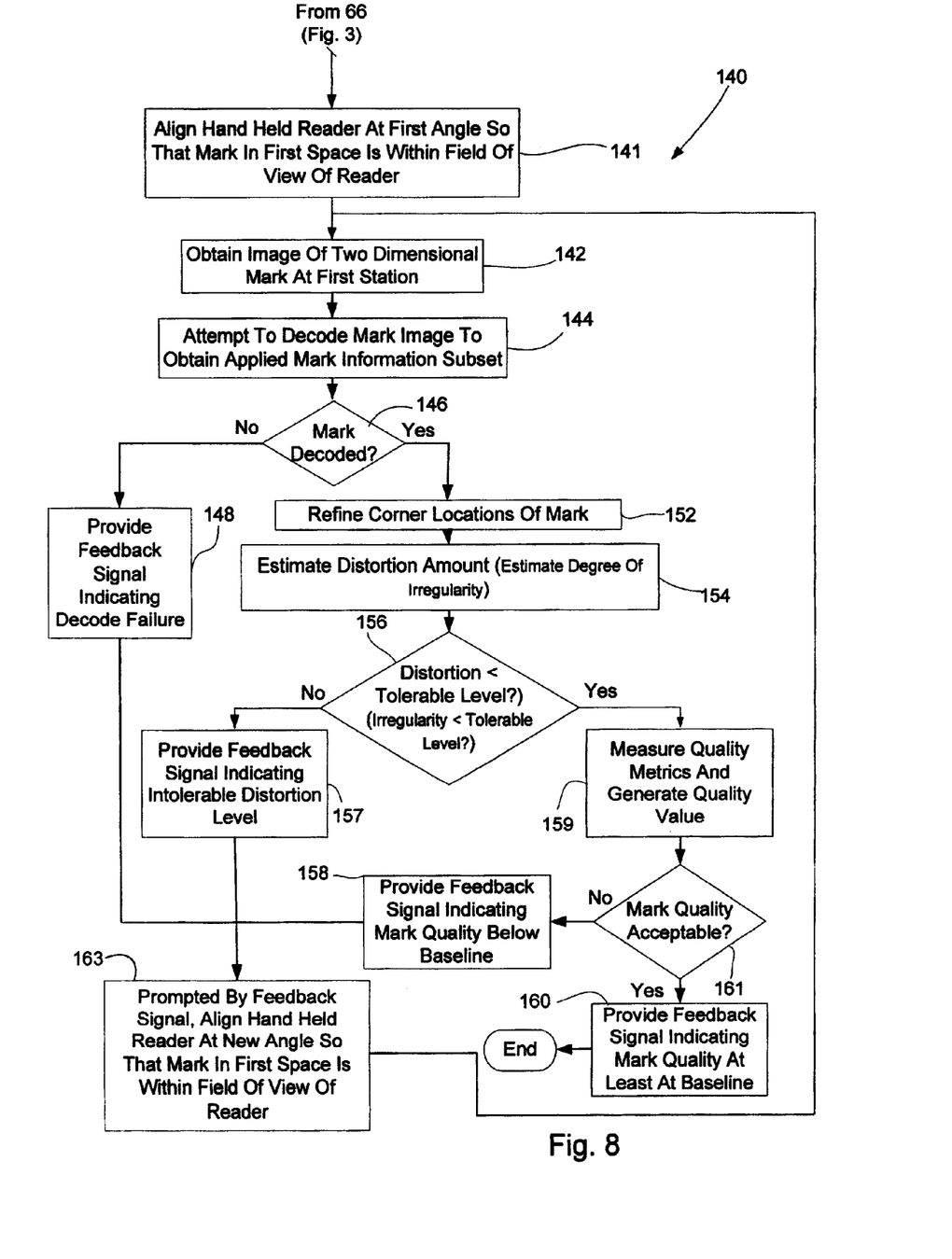
FIG. 8 is a flowchart illustrating a subprocess that may be substituted for a portion of the process of FIG. 3 where a handheld reader is used instead of a stationary camera to obtain an image of a mark.

Referring now to FIG. 8, a subprocess 140 that may be substituted for a portion of the process shown in FIG. 3 is illustrated. Referring also to FIG. 3, in the case of a handheld device, the process steps 62 and 64 are performed to provide known symbol characteristics and a baseline quality value to the processor 50 (see again FIG. 2) that is associated with handheld reader 114. The two dimensional mark at block 66 is applied either at station 130 or may have previously been applied at some other station or indeed at another facility. After block 66 in FIG. 3, control passes to block 141 in FIG. 8. Referring also to FIGS. 2 and 6, at block 141, a handheld reader user aligns the handheld reader at a first angle as shown in FIG. 6 so that mark 19 in first space 22 is within the field of view 24 of reader 114. At block 142, trigger 126 is activated causing reader 114 to obtain an image of the two dimensional mark 19 at station 130. At block 144, processor 50 attempts to decode the mark to obtain an applied mark information subset. At block 146, where decoding fails, control passes to block 148 where reader 114 provides a feedback signal indicating that decoding failed. At block 150, prompted by the failed decode feedback signal, the reader user realigns the handheld reader 114 at a new angle (see, for example, FIG. 7) so that mark 19 in the first space 22 is again within the field of view of the reader 114. After block 150, control passes back up to block 142 where a second image of the mark 19 is obtained.

Referring still to FIGS. 2, 6 and 8, at decision block 146, after the mark 19 is successfully decoded, control passes down to block 152 where processor 50 verifies the corner locations of the mark in the obtained image. At block 154, processor 50 estimates the amount of distortion in the imaged mark (or the amount of some other irregularity of interest). At decision block 156, processor 50 determines if the distortion amount is at an acceptable level. Where distortion is below a tolerable level, a feedback signal is provided at block 158. After block 158 control passes to block 150 where, prompted by the feedback signal, the reader user aligns the handheld reader at a new angle (see again FIG. 7) so that the mark 19 in the first space 22 is within the field of view of the reader. After block 150, control passes again back up to block 142 where a new image of the mark is obtained.

Referring yet again to FIGS. 2, 6 and 8, at decision block 156, when the distortion level is acceptable, control passes to block 159. At block 159, metrics are read from the imaged mark and an applied mark quality value is calculated which is compared to a baseline at block 161. Appropriate feedback signals are provided at blocks 158 or 160. Where the feedback signal indicates a low quality mark, at block 150 the user is prompted to reposition the reader 114 to obtain another mark image. After block 160 the process ends.

Although not shown, it should be recognized that the sub-processes described above with respect to FIGS. 4 and 5 may be performed in the context of hand held readers as described with respect to FIGS. 6-8.

In at least some embodiment, it is contemplated that processor 50 may use the feedback devices 15 and/or 17 to provide even more informative clues to a handheld reader user as to whether or not mark quality is increasing or decreasing as the reader is moved about with respect to a mark. For example, in at least some cases, it is contemplated that a reader user may depress trigger 126 and keep the trigger in the activated position thereby causing reader 114 to continually and quickly obtain new images whenever mark quality falls below the baseline value. Here, as the quality of the mark in successive images changes, the output signals can be modified to indicate whether or not the quality is increasing or decreasing to aid the user in "hunting" for an appropriate juxtaposition between the reader and mark in which the mark is appropriately presented. For instance, essentially in real time where the quality between successive mark images is increasing, the duration of beeps generated via speaker 17 may be increased or the periods between beeps may be shortened almost like a Geiger counter to indicate an increase or decrease in quality. Similarly, as quality is increased, more LEDs 15 may be energized until, when all of the LEDs 15 are energized, an image of a mark is obtained with a mark that has a quality level that exceeds the baseline level.

Figure 9:
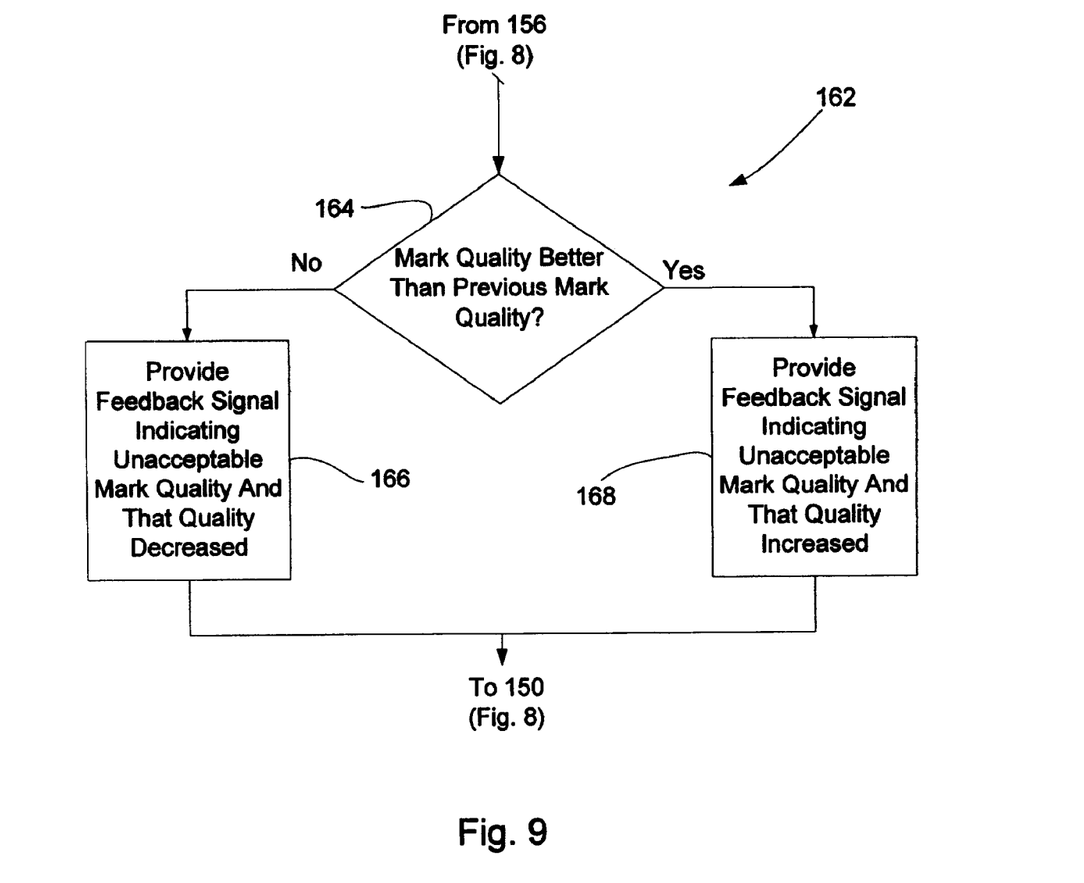
FIG. 9 is a flowchart illustrating a subprocess that may be substituted for a portion of the process of FIG. 8 for providing more instructive feedback to a handheld reader user regarding quality of imaged marks to aid a user in movement of the handheld reader to a proper location for obtaining a suitable mark image for verification purposes.

Consistent with the comments in the previous paragraph, referring to FIG. 9, an exemplary method subprocess 162 that may be substituted for process block 158 in FIG. 8 is illustrated. Referring also to FIGS. 2, 6 and 8, when the mark quality at decision block 156 is not acceptable, control may pass to block 164 in FIG. 9 where processor 50 determines whether or not the mark quality is better than the previous mark quality associated with the previously obtained image. As the mark quality is decreasing, at block 166, a feedback signal is provided that indicates unacceptable mark quality and that the quality is decreasing. On the other hand, where the mark quality is increasing, control passes to block 168 where the feedback signal indicates that the mark quality signal is unacceptable but that the quality is increasing.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 10:
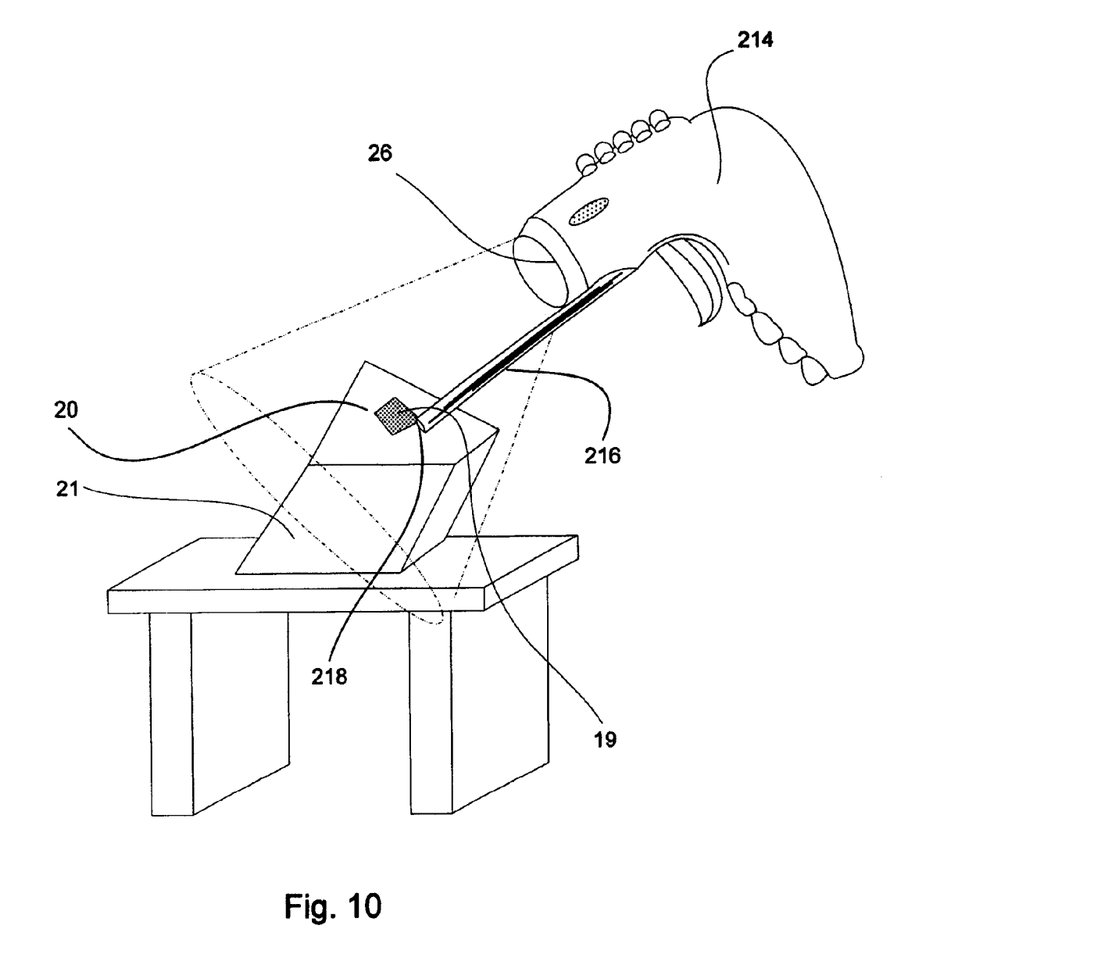
FIG. 10 is a schematic similar to FIG. 6, albeit showing a hand held reader with a distance extension member.

Referring now to FIG. 10, another exemplary embodiment of a hand held reader 214 is shown for reading a mark 19 on a first surface 20 of an object 21. Here, the reader 214 is different than the readers described above in that reader 214 includes a range finder or range extension 216 that extends from a front end thereof. Range extension 216 is a rigid member that extends along a trajectory that is substantially parallel to the central trajectory (not labeled) along which the reader field of view 24 is directed. In operation, a reader user positions reader 214 so that a distal end 218 of extension contacts first surface 20 adjacent a mark 19 to be read prior to activating the reader 214. Here, the length of extension 216 is designed so that an optimal imaging distance occurs between the reader 214 and surface 20 when distal end 218 contacts surface 20. Thus, extension 216 contains at least one imaging variable in at least some embodiments.

Referring still to FIG. 10, while extension 216 is shown as rigid and integrally formed with reader 214, in some cases extension 216 may be flexible, may be telescoping like a radio antenna, may fold into a storage position, etc. In some cases extension 216 may be removable. For instance, extension 216 may include an external thread at the proximal end or may otherwise attach at the proximal end (e.g., via a collar or the like that fits over the lateral portion of optics 26).

Thus, the invention is to cover all modifications, equivalents, and alternatives falling within the spirit and scope of the invention as defined by the following appended claims.

To apprise the public of the scope of this invention, the following claims are made:

What is claimed is:

1. A system for assessing the quality of a two dimensional mark applied to a first surface of a component, the system comprising:

a reader including a field of view generally directed along a first trajectory, the reader for obtaining an image of the two dimensional mark when the mark is within the reader field of view;

a range extension extending from the reader along a second trajectory that is substantially parallel to the first trajectory, the extension including a distal end and having a length dimension such that when the distal end of the extension is adjacent the first surface, the first surface is at an optimal imaging distance from the reader, wherein the optimal imaging distance is within a range including distances that are acceptable for obtaining focused images using the reader; and a processor for receiving reader generated images and programmed to perform a mark quality assessment process on the obtained images to generate quality assessment values associated with the images, when the quality assessment value is lower than a baseline assessment value, the processor providing one of an audible signal and a visual signal to a handheld reader user indicating that the reader should be repositioned so that a new image can be obtained and, when a quality assessment value is at least equal to the baseline assessment value, providing one of an audible signal and a visual signal to the handheld reader user indicating that the quality assessment value is at least equal to the baseline assessment value, wherein the extension moves along with the reader so that the extension is always in the same relative juxtaposition with respect to the reader field of view.

2. The system of claim 1 wherein the reader is a hand held reader.

3. The system of claim 1 wherein the distal end contacts the first surface when the first surface is at an optimal imaging distance from the reader.

4. The system of claim 1 wherein the extension is physically connected to the reader.

5. The system of claim 1 wherein the camera includes optics, the extension is separate from the optics and the distal end of the extension extends past the optics.

* * * * *